Patented Aug. 11, 1936

2,050,263

UNITED STATES PATENT OFFICE 2,050,263

METHOD OF TREATING ROSIN AND ROSIN PRODUCT

Joseph N. Borglin, Wilmington, and Leavitt N. Bent, Holly Oak, Del., assignors to Hercules Powder Company, Wilmington, Del., a corporation of Delaware No Drawing. Original application November 19, 1931, Serial No. 576,200. Divided and this application April 5, 1934, Serial No. 719,146

14 Claims. (Cl. 260—108)

This invention relates to a method of treating rosin, as wood or gum rosin, and to a novel and advantageous rosin product.

More particularly, this invention relates to a method of treating rosin by which a novel and advantageous rosin product may be obtained and by which, at the same time, a refined or purified rosin is obtained. The novel rosin product will be found to be insoluble in gasoline, soluble in alcohol, it may be decomposed by water and will be found to be advantageously adaptable for various use in the commercial arts. The refined or purified rosin produced will be found to be purified or refined more particularly by the elimination of coloring matter or color bodies and hence where a low grade rosin is subjected to treatment in accordance with the method of this invention, a rosin of high color grade may be obtained.

In accordance with the method embodying this invention, rosin, as wood or gum rosin, is subjected to treatment with an alkylamine, as for example, mono-, di-, and polyalkylamines, the alkylamine preferably being an hydroxy alkylamine. The rosin is preferably treated in solution in a suitable solvent therefor. As a result of the treatment the alkylamine will react with the rosin for the formation of a precipitate comprising largely the reaction product of oxidized abietic acid, color bodies and other reactive constituents of the rosin with the alkylamine. The precipitate will also contain more or less reaction product of the reaction of abietic acid with the alkylamine, depending upon the amount of alkylamine used in the treatment. The novel product in accordance with this invention will comprise the precipitate described, while the rosin remaining in the treated solution may be recovered as refined or purified rosin after separation from the precipitate. It will be appreciated that by control within wide limits of the amount of alkylamine used for the treatment of any given amount of rosin, the relative proportions of novel product or of refined rosin may be varied.

In proceeding in accordance with the method embodying this invention, as has been indicated, the rosin, which may be either wood or gum rosin, may be subjected to treatment in solution in a suitable solvent for rosin, as gasoline or other light petroleum distillate. The function of the solvent is primarily to effect dispersion of the rosin to enable efficient contact between the rosin and the alkylamine and the solvent does not enter into the reaction involved. Hence, it may be any suitable solvent for rosin which is non-aqueous and non-reactive with the alkylamine used for the treatment.

The alkylamine, as has been indicated, may be a mono-, di-, or polyalkylamine and may be an ethanolamine, a methanolamine, or the like. For example, we may use mono-, di-, or tri-ethanolamine or similar methanolamines, glycerolamine, etc., and preferably such containing a hydroxy group. It will be appreciated that the alkylamines may be used in admixture and that, for example, various of the polyalkylamines will contain some mono-, and/or diamines, especially where the commercial grade is used. Thus, for example, commercial triethanolamine, while it contains a preponderating proportion of triethanolamine, will also contain considerable quantities of mono- and diethanolamine.

In carrying out the method embodying this invention, by way of illustration, for example, 300 parts of a 15% solution in gasoline of wood rosin, grading, for example, FF in color, are washed by agitation with, for example, 3 parts of triethanolamine. The precipitate formed is separated from the gasoline-rosin solution by drawing off the solution or by filtration. The separated gasoline-rosin solution is desirably washed with water and the gasoline then evaporated. The rosin recovered from the gasoline-rosin solution will amount to about 89% of the rosin treated and will be found to be purified and refined and to grade H in color.

The precipitate will comprise largely triethanolamine oxy-abietate and color bodies from the rosin treated. The triethanolamine abietate will be found to be insoluable in gasoline, soluble in alcohol and to have various uses in the commercial arts. The precipitate, as has been indicated, may be decomposed by water and hence, if desired, may be hydrolyzed, for example, with hot water to abietic acid, oxyabietic acid and triethanolamine. The abietic acid may then be recovered from the solution by extraction with a solvent therefor, as for example, gasoline, or other light petroleum distillate, etc., and from the extract after its separation from the solutions a dark rosin, grading in color somewhat darker than D, may be recovered by, for example, evaporation off of the solvent; and the triethanolamine may be recovered for reuse by evaporation off of the water after separation from the gasoline-rosin extract. Desirably the solution may be filtered after separation of the gasoline extract and before evaporation of the water for recovery of the alkylamine.

As a further illustration, for example, 300 parts of a 15% solution of rosin, grading, for example, FF in color, in gasoline are washed with 6 parts of diethanolamine, the gasoline-rosin solution separated from the precipitate formed and the gasoline recovered from the gasoline-rosin solution by, for example, evaporating off the gasoline. A 68% yield of rosin grading H in color will be obtained from the gasoline-rosin solution. The precipitate may be utilized as recovered or, if it be desirable to recover the rosin therefrom and purifying agent therefrom, such may be effected as indicated above after hydrolysis with water.

In carrying out the method in accordance with this invention, the procedure may be carried out without the necessity for any particular form or type of apparatus and, as will be obvious, may be carried out as a batch or continuous method. The treatment may be effected at room temperature or below, or if desired the temperature may be increased, avoiding, of course, the use of a temperature at which the solvent for the rosin will be lost to any substantial extent during the treatment.

It will be appreciated, and as appears from the above illustrations, that the alkylamine may be used in widely varying amounts, depending upon the relative proportions of refined rosin precipitate, or new product, desired to be obtained. Where refined rosin is principally desired, the maximum amount of alkylamine used will be limited by the degree of purity or refinement desired for the rosin product. On the other hand, where the precipitate, or new product, is primarily desired, the alkylamine may be used in quantity sufficient to react with substantially all of the rosin, or may be used in excess.

It will be understood that the terms "oxyabietic acid" and "oxy-abietate" as used herein and in the claims appended hereto are intended to include hydroxy-abietic acid and hydroxyabietate.

This application is a division of an application, Serial No. 576,200, filed November 19, 1931, by Joseph N. Borglin and Leavitt N. Bent, now Patent No. 1,995,600, dated March 26, 1935.

What we claim and desire to protect by Letters Patent is:

1. As a new composition of matter an alkylamine oxy-abietate.
2. As a new composition of matter a polyalkylamine oxy-abietate.
3. As a new composition of matter an ethanolamine oxy-abietate.
4. As a new composition of matter a polyethanolamine oxy-abietate.
5. As a new composition of matter triethanolamine hydroxy-abietate.
6. As a new composition of matter triethanolamine oxy-abietate.
7. As a new composition of matter a glycerolamine oxy-abietate.
8. As a new composition of matter a polyglycerolamine oxy-abietate.
9. As a new composition of matter a triglycerolamine oxy-abietate.
10. As a new composition of matter a methanolamine oxy-abietate.
11. As a new composition of matter a trimethanolamine oxy-abietate.
12. An alkylamine salt of oxidized abietic acid.
13. A polyalkylamine salt of oxidized abietic acid.
14. An alkylamine salt of hydroxy-abietic acid.

JOSEPH N. BORGLIN.
LEAVITT N. BENT.